(12) United States Patent
Yamada (10) Patent No.: US 7,559,267 B2
(45) Date of Patent: Jul. 14, 2009

(54) EXTENDABLE SHAFT FOR VEHICLE STEERING

(75) Inventor: Yasuhisa Yamada, Gunma-ken (JP)

(73) Assignee: NSK Ltd., Tokyo (JP)

( * ) Notice: Subject to any disclaimer, the term of this patent is extended or adjusted under 35 U.S.C. 154(b) by 677 days.

(21) Appl. No.: 10/529,750

(22) PCT Filed: Sep. 18, 2003

(86) PCT No.: PCT/JP03/11892

§ 371 (c)(1),
(2), (4) Date: Mar. 30, 2005

(87) PCT Pub. No.: WO2004/031021

PCT Pub. Date: Apr. 15, 2004

(65) Prior Publication Data

US 2006/0060022 A1    Mar. 23, 2006

(30) Foreign Application Priority Data

Oct. 2, 2002    (JP) .............................. 2002-289965

(51) Int. Cl.
*B62D 1/18* (2006.01)

(52) U.S. Cl. ........................ 74/493; 280/775

(58) Field of Classification Search .............. 74/493; 280/775; 464/167
See application file for complete search history.

(56) References Cited

U.S. PATENT DOCUMENTS

| 2,607,257 | A |   | 8/1952 | Hadden |
|---|---|---|---|---|
| 3,169,407 | A |   | 2/1965 | Newell |
| 3,279,218 | A | * | 10/1966 | Chocholek et al. .......... 464/167 |
| 3,356,424 | A |   | 12/1967 | Edwards |
| 3,392,599 | A |   | 7/1968 | White |
| 3,444,753 | A |   | 5/1969 | Runkle |
| 3,604,285 | A |   | 9/1971 | Erland et al. |
| 3,879,093 | A |   | 4/1975 | Betrix |
| 4,012,925 | A |   | 3/1977 | Krude |
| 4,280,341 | A |   | 7/1981 | Krude |
| 4,357,137 | A |   | 11/1982 | Brown |
| 4,384,861 | A |   | 5/1983 | Lange et al. |
| 4,500,141 | A |   | 2/1985 | Daugherty |
| 4,509,386 | A |   | 4/1985 | Kimberlin |
| 4,667,530 | A |   | 5/1987 | Mettler et al. |
| 4,705,491 | A |   | 11/1987 | Andersson |
| 5,184,978 | A |   | 2/1993 | Fillmore et al. |
| 5,226,853 | A |   | 7/1993 | Courgeon |

(Continued)

FOREIGN PATENT DOCUMENTS

AU                234387          12/1959

(Continued)

*Primary Examiner*—Thomas R Hannon
*Assistant Examiner*—Justin Krause
(74) *Attorney, Agent, or Firm*—Miles & Stockbridge P.C.

(57) ABSTRACT

A telescopic shaft used for steering of a vehicle to be used in the steering shaft of a vehicle has a male shaft and a female shaft that are fitted to each other non-rotatably and slidably. The telescopic shaft is provided with at least one set of torque transmission members disposed in at least one set of intermediate fitting portions formed on the outer circumferential surface of the male shaft and the inner circumferential shaft of the female shaft and a stopper plate for regulating movement of the at least one set of torque transmission members with respect to the axial direction.

9 Claims, 13 Drawing Sheets

U.S. PATENT DOCUMENTS

| | | |
|---|---|---|
| 5,235,734 A | 8/1993 | DuRocher |
| 5,460,574 A | 10/1995 | Hobaugh |
| 5,542,343 A | 8/1996 | Martin |
| 5,709,605 A | 1/1998 | Riefe et al. |
| 5,899,811 A | 5/1999 | Kishibuchi et al. |
| 6,035,740 A | 3/2000 | Budaker et al. |
| 6,174,239 B1 | 1/2001 | Guimbretiere |
| 6,279,953 B1 | 8/2001 | Cartwright |
| 6,293,872 B1 | 9/2001 | Ganser |
| 6,343,993 B1 | 2/2002 | Duval et al. |
| 6,364,778 B1 | 4/2002 | Beitzel et al. |
| 6,474,868 B2 | 11/2002 | Geyer et al. |
| 6,510,756 B2 | 1/2003 | Aota |
| 6,533,459 B2 | 3/2003 | Podhajecki et al. |
| 6,557,433 B1 | 5/2003 | Castellon |
| 6,620,050 B2 | 9/2003 | Park |
| 6,729,648 B2 | 5/2004 | Ulintz |
| 6,733,039 B2 | 5/2004 | Honda et al. |
| 6,755,746 B2 | 6/2004 | Barnley et al. |
| 6,761,503 B2 | 7/2004 | Breese |
| 6,893,353 B2 | 5/2005 | Dutkiewicz et al. |
| 6,902,487 B2 | 6/2005 | Welschof |
| 6,921,338 B2 | 7/2005 | Cermak et al. |
| 6,948,401 B2 | 9/2005 | Zernickel et al. |
| 7,147,375 B2 | 12/2006 | Zernickel et al. |
| 7,226,360 B2 | 6/2007 | Lyon et al. |
| 2001/0006564 A1 | 7/2001 | Geyer et al. |
| 2002/0177485 A1 | 11/2002 | Cermak et al. |
| 2003/0073503 A1 | 4/2003 | Perrow |
| 2004/0245759 A1 | 12/2004 | Yamada et al. |
| 2005/0022623 A1 | 2/2005 | Reiche et al. |
| 2005/0070365 A1 | 3/2005 | Riefe et al. |
| 2005/0104354 A1 | 5/2005 | Yamada et al. |
| 2005/0257639 A1 | 11/2005 | Yamada |
| 2006/0012161 A1 | 1/2006 | Yamada |
| 2006/0039747 A1 | 2/2006 | Shoda et al. |
| 2006/0053934 A1 | 3/2006 | Bahr et al. |
| 2006/0068924 A1 | 3/2006 | Yamada |
| 2006/0082120 A1 | 4/2006 | Taniguchi et al. |
| 2006/0156855 A1 | 7/2006 | Yukawa et al. |
| 2006/0162989 A1 | 7/2006 | Yamada |
| 2006/0181069 A1 | 8/2006 | Yamada |
| 2006/0252559 A1 | 11/2006 | Yamada |
| 2007/0157754 A1 | 7/2007 | Yamada |
| 2007/0273137 A1 | 11/2007 | Yamada et al. |

FOREIGN PATENT DOCUMENTS

| | | |
|---|---|---|
| DE | 37 30 393 | 3/1989 |
| DE | 195 38 303 A1 | 4/1997 |
| DE | 198 20 291 A1 | 11/1999 |
| DE | 19824477 | 12/1999 |
| DE | 19905350 | 8/2000 |
| DE | 10202899 | 8/2002 |
| DE | 20212294 | 10/2003 |
| EP | 0281723 | 9/1988 |
| EP | 1 078 843 | 1/2000 |
| EP | 1065397 | 1/2001 |
| EP | 1078843 | 2/2001 |
| EP | 1106851 | 6/2001 |
| EP | 1167790 | 1/2002 |
| EP | 1247719 | 10/2002 |
| EP | 1 512 607 A1 | 3/2005 |
| EP | 1 547 903 A1 | 6/2005 |
| EP | 1557338 | 7/2005 |
| EP | 1568569 | 8/2005 |
| EP | 1588921 | 10/2005 |
| ES | 2161127 | 11/2001 |
| FR | 2795787 | 1/2001 |
| GB | 2344084 | 5/2000 |
| GB | 2362688 | 11/2001 |
| GB | 2373551 | 9/2002 |
| JP | 45-19207 | 8/1970 |
| JP | 62-244758 | 10/1987 |
| JP | UM-1-145670 | 10/1989 |
| JP | UM-4-43522 | 4/1992 |
| JP | 29-16708 | 6/1992 |
| JP | UM-4-123775 | 11/1992 |
| JP | 2000-38142 | 2/2000 |
| JP | 2000-205288 | 7/2000 |
| JP | 2000-337395 | 12/2000 |
| JP | 2001-50293 | 2/2001 |
| JP | 2001-193738 | 7/2001 |
| JP | 2001-239944 | 9/2001 |
| JP | 2002-46633 | 2/2002 |
| JP | 2000-159042 | 6/2002 |
| JP | 2002-286034 | 10/2002 |
| JP | 2002-539033 | 11/2002 |
| SU | 398786 | 9/1973 |
| WO | WO 86/07120 | 12/1986 |
| WO | WO 99/08920 | 2/1999 |
| WO | WO 00/55028 | 9/2000 |
| WO | WO 2004/033270 | 4/2004 |

\* cited by examiner

EXTENDABLE SHAFT FOR VEHICLE STEERING

TECHNICAL FIELD

The present invention relates to a telescopic shaft used for steering of a vehicle.

BACKGROUND ART

Figure 13:
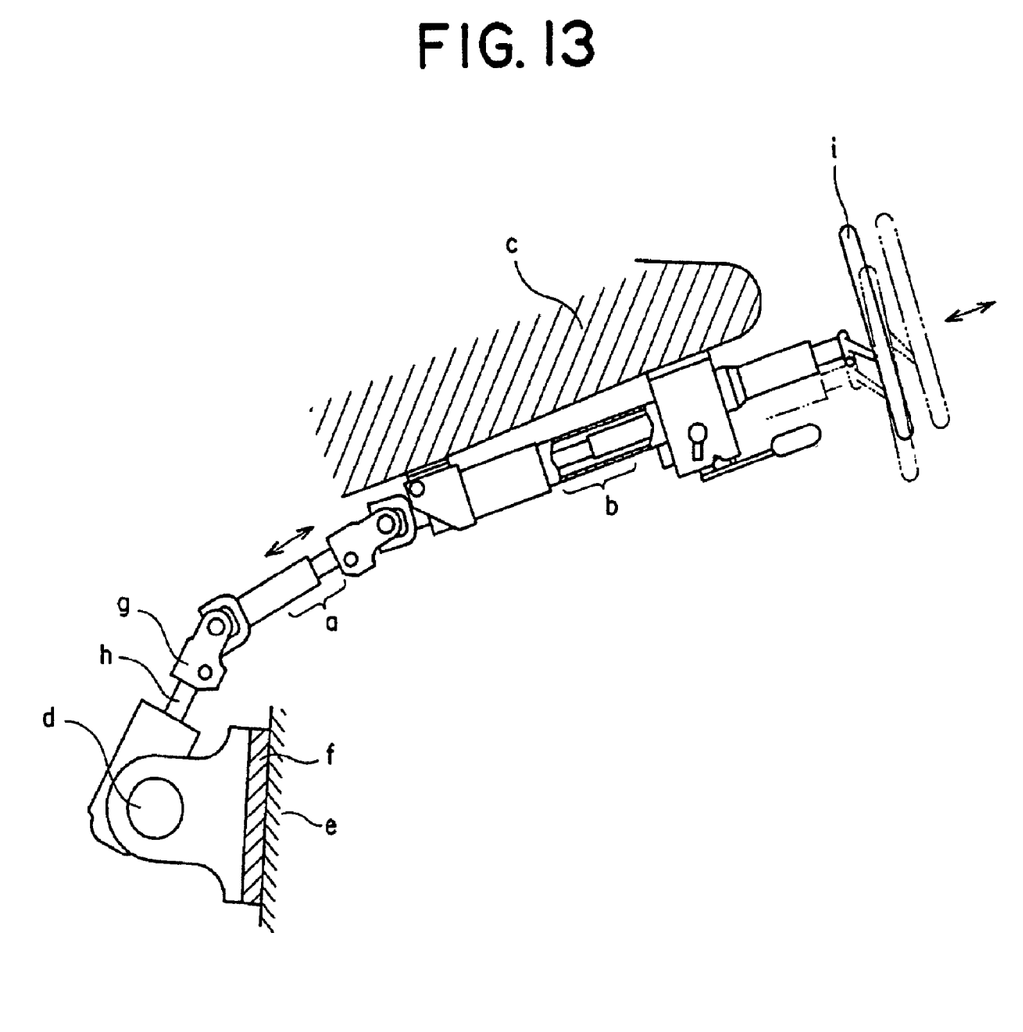
FIG. 13 is a side view showing the steering mechanism of a common automobile.

FIG. 13 shows a steering mechanism of a common automobile. The parts designated by a and b in this drawing are telescopic shafts. The telescopic shaft a is formed by spline fitting a male shaft and a female shaft. The telescopic shaft a of this type is required to have the properties of absorbing axial displacement that occurs while the automobile is running and preventing transmission of the displacement and vibration to the steering wheel. Such properties are generally required in the case that the vehicle body has a sub-frame structure and the portion c on which the upper portion of the steering mechanism is secured and the frame e on which the steering rack d is secured are constructed as separate members that are steadily joined by an elastic member f such as a rubber. In some other cases, the telescopic function is required in order for an assembling engineer in charge of joining a steering shaft joint g to a pinion shaft h, to fit and secure the telescopic shaft to the pinion shaft after retracting it. The telescopic shaft b provided in the upper portion of the steering mechanism also has a male shaft and female shaft spline connected. The telescopic shaft b is required to be extended and retracted in the axial direction in order for the driver to change and adjust the position of the steering wheel i in the axial direction to achieve the optimum position for driving the automobile. In all the above-mentioned cases, it is demanded to reduce the rattling noise of the spline portion of the telescopic shaft, to soften rattly feeling of the steering wheel and to decrease sliding resistance of the telescopic shaft when it is slid in the axial direction.

In view of the above, EP1078843A1 teaches to fit multiple sets of torque transmission members (column-like members) in multiple sets of axial grooves formed on the outer circumferential surface of the male shaft and the inner circumferential surface of the female shaft.

Each set of the torque transmission members (cylindrical members) include a plurality of needle rollers arranged along the axial direction.

Thus, play between the male shaft and the female shaft can be eliminated when the torque is not transmitted, and the male shaft and the female shaft can be slid in the axial direction with a stable slide load without play. In addition, when the torque is transmitted, the male shaft and the female shaft can transmit the torque with high rigidity while eliminating play in the rotational direction.

Furthermore, between the plurality of needle rollers arranged along the axial direction, there is provided adjusting members made of a resin, which is adapted to absorb the clearance (or play) between the needle rollers.

However, although EP1078843A1 teaches to absorb the clearance between the plurality of needle rollers by means of adjusting members provided between the needle rollers arranged along the axial direction, clearance sometimes remains between the needle rollers, which may cause a knocking sound.

DISCLOSURE OF THE INVENTION

The present invention has been made in view of the above-described circumstances, and an object of the present invention is to provide a telescopic shaft used for steering of a vehicle that can realize a stable slide load and prevent play in the rotational direction reliably to enable torque transmission with high rigidity while preventing generation of noises.

To achieve the above object, according to the present invention, there is provided a telescopic shaft used for steering of a vehicle in which a male shaft and a female shaft are fitted to each other non-rotatably and slidably, wherein at least one set of torque transmission members are disposed in at least one set of intermediate fitting portions formed on the outer circumferential surface of said male shaft and the inner circumferential surface of said female shaft, and a stopper plate for regulating movement of said at least one set of torque transmission members with respect to the axial direction is provided at an end portion of said male shaft or in the vicinity thereof.

In this way, according to the present invention, it is possible to secure the torque transmission members with a moderate preload without clearance in the axial direction. Thus, the torque transmission members are not moved in the axial direction when the male shaft and the female shaft slide relative to each other, and it is possible to prevent unpleasant knocking sounds form being generated.

In the telescopic shaft used for steering of a vehicle according to the present invention, it is preferable that said at least one set of intermediate fitting portions be composed of at least one pair of axial grooves formed on the outer circumferential surface of said male shaft and the inner circumferential surface of said female shaft respectively, and the axial grooves of said male shaft have a surface that is substantially perpendicular to the axial direction and in contact with said at least one set of torque transmission members. According to this preferable structure, thanks to the provision of the surface that is oriented substantially perpendicularly to the axial direction and in contact with the torque transmission members, it is possible to regulate movement of the torque transmission members with respect to the axial direction by means of this surface perpendicular to the axial direction without providing an additional member. Accordingly, it is possible to reduce the number of the parts to realize a reduction in the manufacturing cost. In addition, since no additional member is used, reduction in the weight and size is made possible.

Furthermore, in the telescopic shaft used for steering of a vehicle according to the present invention, it is preferable that said stopper plate be composed of an elastic member for applying axial preload and a pair of flat plates that hold the elastic member therebetween. According to this preferable structure, thanks to the stopper plate composed of an elastic member for applying axial preload and the pair of flat plates that hold the elastic member therebetween, it is possible to prevent axial movement of the torque transmission members by applying a moderate preload to the torque transmission member to positively preventing unpleasant knocking sounds from being generated.

Furthermore, in the telescopic shaft used for steering of a vehicle according to the present invention, it is preferable that said stopper plate be fixed to a small diameter portion formed at an end portion of said male shaft. In this case, the stopper plate will not drop and it can be securely fixed since the stopper plate is fixed to the small diameter portion formed at an end portion of the male shaft.

Furthermore, in the telescopic shaft used for steering of a vehicle according to the present invention, it is preferable that said stopper plate be composed of a flat plate and fixing means for fixing the flat plate at a desired position with respect to the axial direction on said male shaft. In this preferable structure, said stopper plate is composed of a flat plate and fixing means for fixing the flat plate at a desired position with respect to the axial direction on the male shaft. In this way, when an elastic member is not used in the stopper plate, fixing means that can fix the flat plate at a desired axial position is used. After setting the torque transmission members in the intermediate fitting portion of the male shaft, the flat plate is intermediately set, and the fixing means is pressed against it from the axial direction and fixed so that undesirable clearance is eliminated. Thus, the torque transmission members are not moved in the axial direction when the male shaft and the female shaft slide relative to each other, and it is possible to prevent unpleasant knocking sounds from being generated.

EMBODIMENTS OF THE INVENTION

In the following, embodiments of the telescopic shaft used for setting of a vehicle according to the present invention are disclosed with reference to the drawings.

First Embodiment

Figure 1:
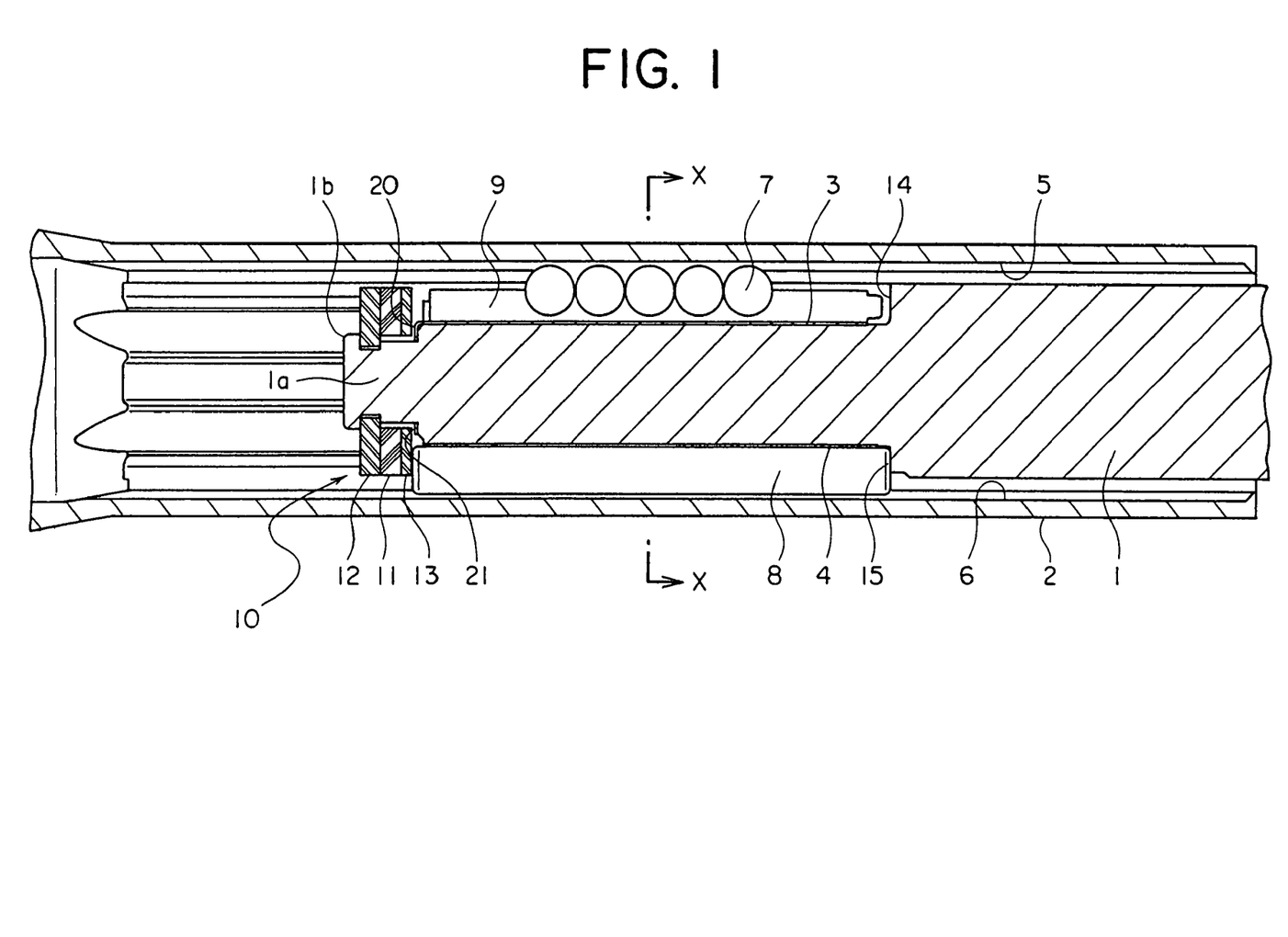
FIG. 1 is a longitudinal cross sectional view showing a telescopic shaft used for steering of a vehicle according to a first embodiment of the present invention.
Figure 2:
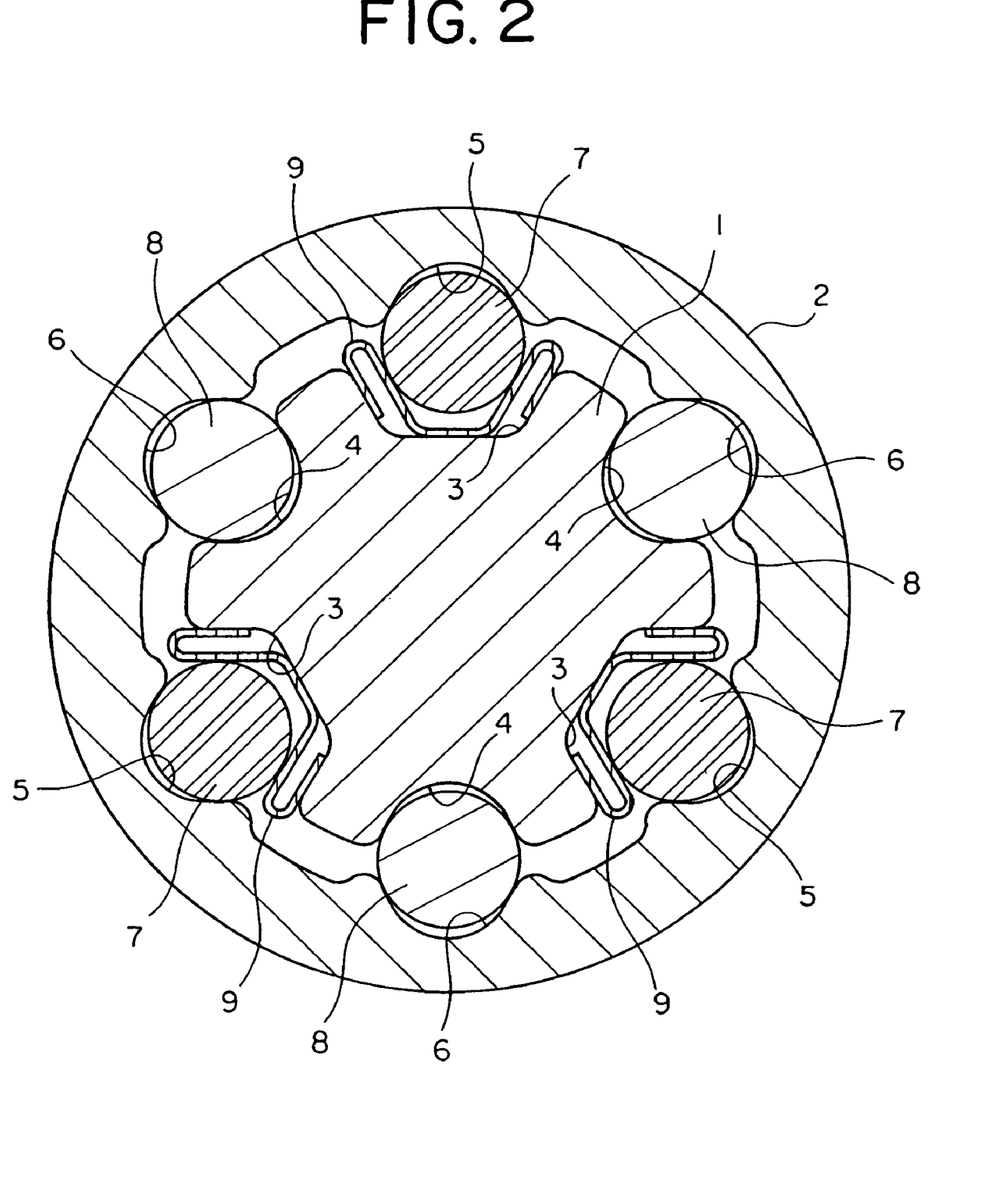
FIG. 2 is a transverse cross sectional view taken along line X-X in FIG. 1.

FIG. 1 is a longitudinal cross sectional view showing a telescopic shaft used for steering of a vehicle according to the first embodiment of the present invention. FIG. 2 is a transverse cross sectional view taken along line X-X in FIG. 1.

As shown in FIG. 1, the telescopic shaft used for steering of a vehicle (which will be referred to as the telescopic shaft hereinafter) is composed of a male shaft 1 and a female shaft 2 that are fitted to each other non-rotatably and slidably.

As shown in FIG. 2, on the outer circumferential surface of the male shaft 1, three axially extending grooves 3 arranged at regular intervals of 120 degrees along the circumferential direction are formed. In addition, on the outer circumferential surface of the male shaft 1, three axially extending grooves 4 having a substantially circular arc shape arranged circumferentially between the three axial grooves 3 at regular intervals of 120 degrees along the circumferential direction are formed.

On the inner circumferential surface of the female shaft 2, three axially extending grooves 5 having a circular arc shape are provided at regular intervals of 120 degrees along the circumferential direction. In addition, on the inner circumferential surface of the female shaft 2, three axially extending grooves 6 having a substantially circular arc shape arranged circumferentially between the three axial grooves 5 at regular intervals of 120 degrees along the circumferential direction are formed.

The axial grooves 3 and 5 constitute three first intermediate fitting portions for three sets of spherical members 7 that will be described later, and the axial grooves 4 and 6 constitute three second intermediate fitting portions for three sets of cylindrical members 8 that will be described later. These three pairs of axial grooves 3 and 5 (or the first intermediate fitting portions) and the three pairs of axial grooves 4 and 6 (or the second intermediate fitting portions) are alternately arranged along the circumferential direction at regular intervals of 60 degrees.

A first torque transmission apparatus is constructed by rotatably providing three sets of first torque transmission members (spherical members) 7 between the three axial grooves 3 of the male shaft 1 and the three axial grooves 5 of the female shaft 2 with three corrugated elastic members (or leaf springs) 9 for applying preload therebetween. The first torque transmission members 7 are adapted to roll when the male shaft 1 and the female shaft 2 move in the axial direction relative to each other, and upon rotation of these shafts, to transmit a torque while constrained by the leaf springs 9.

A second torque transmission apparatus is constructed by slidably providing three sets of second torque transmission members (or cylindrical members) 8 between the three axial grooves 4 of the male shaft 1 and the three axial grooves 6 of the female shaft 2 respectively. The second torque transmission members 8 allow axial movement of the male shaft 1 and the female shaft 2 relative to each other, and upon rotation of these shafts, transmit a torque.

The leaf springs 9 are adapted to preload the spherical members 7 and the cylindrical members 8 against the female shaft 2 to eliminate play when the torque is not transmitted, and to deform elastically to constrain the spherical members 7 in the circumferential direction between the male shaft 1 and the female shaft 2 when the torque is transmitted.

In the telescopic shaft having the above-described structure, since the spherical members 7 and the cylindrical members 8 are preloaded by the leaf springs 9 against the female shaft 2 without play, when the torque is not transmitted, play between the male shaft 1 and the female shaft 2 can be eliminated reliably, and when the male shaft 1 and the female shaft 2 relatively move in the axial direction, the male shaft 1 and the female shaft 2 can slide in the axial direction with a steady sliding load without play.

If a sliding surface functions only as a sliding surface as with the case with the conventional art, the preload for preventing play is required to be restricted to a certain load. This is because the sliding load is determined as the product of the friction coefficient and the preload, and if the preload is increased with a view to eliminate play or to improve the rigidity of the telescopic shaft, the sliding load is increased to create vicious circle.

To the contrary, in this embodiment, a rolling mechanism is partly used, and it is possible to increase the preload without a significant increase in the sliding load. Accordingly, improvement in the elimination of play and improvement in the rigidity, which could not be realized in the conventional art, can be achieved without an increase in the sliding load.

When the torque is transmitted, the three sets of leaf springs 9 elastically deform to constrain the three sets of spherical members 7 with respect to the circumferential direction between the male shaft 1 and the female shaft 2. In addition, the three sets of cylindrical members 8 set between the male shaft 1 and the female shaft 2 function to transmit the most part of the torque.

For example, when the torque is input from the male shaft 1, in the earlier stage, there is no play thanks to the preload by the leaf springs 9, and the leaf springs 9 generate reactive forces against the torque to transmit the torque. In this case, the whole torque is transmitted in the state in which the torque transmission load between the male shaft 1, the leaf springs 9, the spherical members 7 and the female shaft 2 and the torque transmission load between the male shaft 1, the cylindrical members 8 and the female shaft 2 are in equilibrium with each other.

When the torque further increases, since the clearance in the rotational direction between the male shaft 1 and the female shaft 2 via the cylindrical members 8 is designed to be smaller than the clearance between the male shaft 1, the leaf spring 9, the spherical members 7 and the female shaft 2 via the spherical members 7, the cylindrical members 8 receive reactive forces larger than the spherical members 7, and the torque is transmitted to the female shaft 2 mainly by the cylindrical members 8. For this reason, play in the rotational direction of the male shaft 1 and the female shaft 2 can be eliminated reliably and the torque can be transmitted in a highly rigid state.

In connection with the above, the spherical members 7 may be balls. The cylindrical members 8 may be needle rollers.

The needle roller 8 is advantageous since it receives the load through line contact and the contact pressure can be made low as compared to the ball 7, which receives the load through point contact. Therefore, the use of the needle rollers is advantageous over the case in which all the rows are constructed as ball rolling structures in the following respects:

Damping effects at the sliding portion is high as compared to the ball rolling structure, and therefore vibration absorption performance is high.

In transmitting the same torque, the contact pressure can be made lower in the case of the needle roller, and therefore the axial length can be made shorter, so that the space can be used efficiently.

In transmitting the same torque, the contact pressure can be made lower in the case of the needle roller, and therefore, an additional process for hardening the surface of the axial grooves on the female shaft by heat processing etc. is not required.

It is possible to reduce the number of the parts.

It is possible to improve the facility of assembling.

It is possible to reduce the assembling cost.

As per the above, the needle rollers 8 function as keys for transmitting torque between the male shaft 1 and the female shaft 2, and in addition, they are in sliding contact with the inner circumferential surface of the female shaft 2. Advantages of this structure over the conventional spline connection are as follows:

The needle rollers are mass-produced parts and available at a very low cost.

Since the needle rollers have been ground after heat processing, their surface hardness is high and they have high durability against wear.

Since the needle rollers have been ground, their surface is fine and the friction coefficient in sliding is low, and therefore, the sliding load can be made low.

Since the length and the setting position of the needle rollers can be changed in accordance with use conditions, they can be adapted to various applications without changing the design concept.

Even in the case that it is required to further reduce the friction coefficient in sliding depending on use conditions, which sometimes occurs, the sliding characteristics can be changed only by applying a surface processing on the needle rollers, namely, the needle rollers can be adapted to various applications without changing the design concept.

Since it is possible to manufacture needle rollers having different diameters in orders of several microns at low cost, it is possible to restrict the clearance between the male shaft, the needle rollers and the female shaft to the minimum, and therefore it is easy to enhance the rigidity in the twisting direction of the shaft.

On the other hand, the partial use of the balls is advantageous in the following respect as compared to the structure in which all the rows are composed of needle rollers and the all the rows are adapted to slide:

Since the frictional resistance is low, the sliding load can be made low.

The preload can be made high, and it is possible to achieve both high rigidity and elimination of play for a long time.

Figure 3:
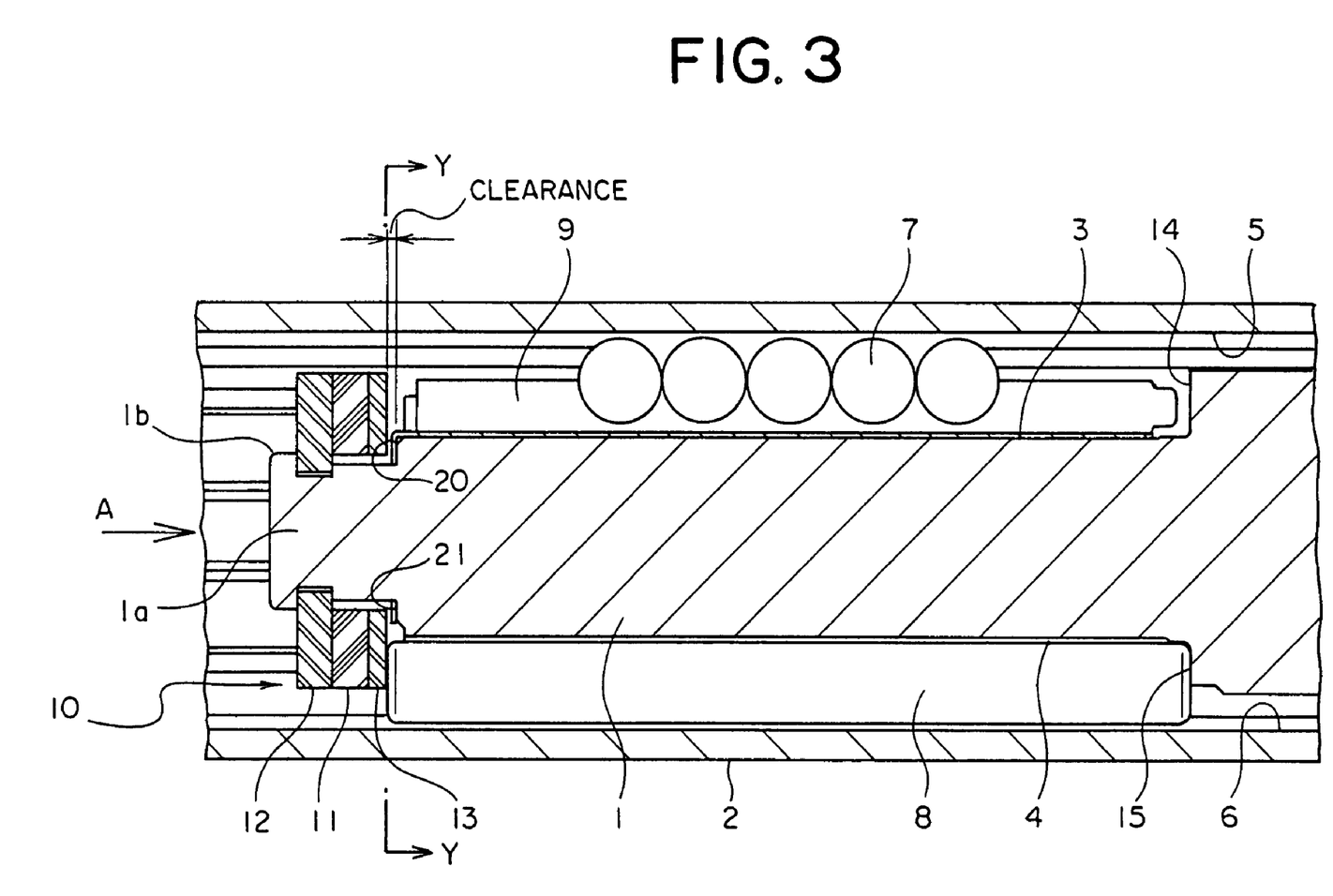
FIG. 3 is an enlarged longitudinal cross sectional view of the principal part of FIG. 1.

FIG. 3 is an enlarged longitudinal cross sectional view showing the principal portion of FIG. 1.

Figure 4:
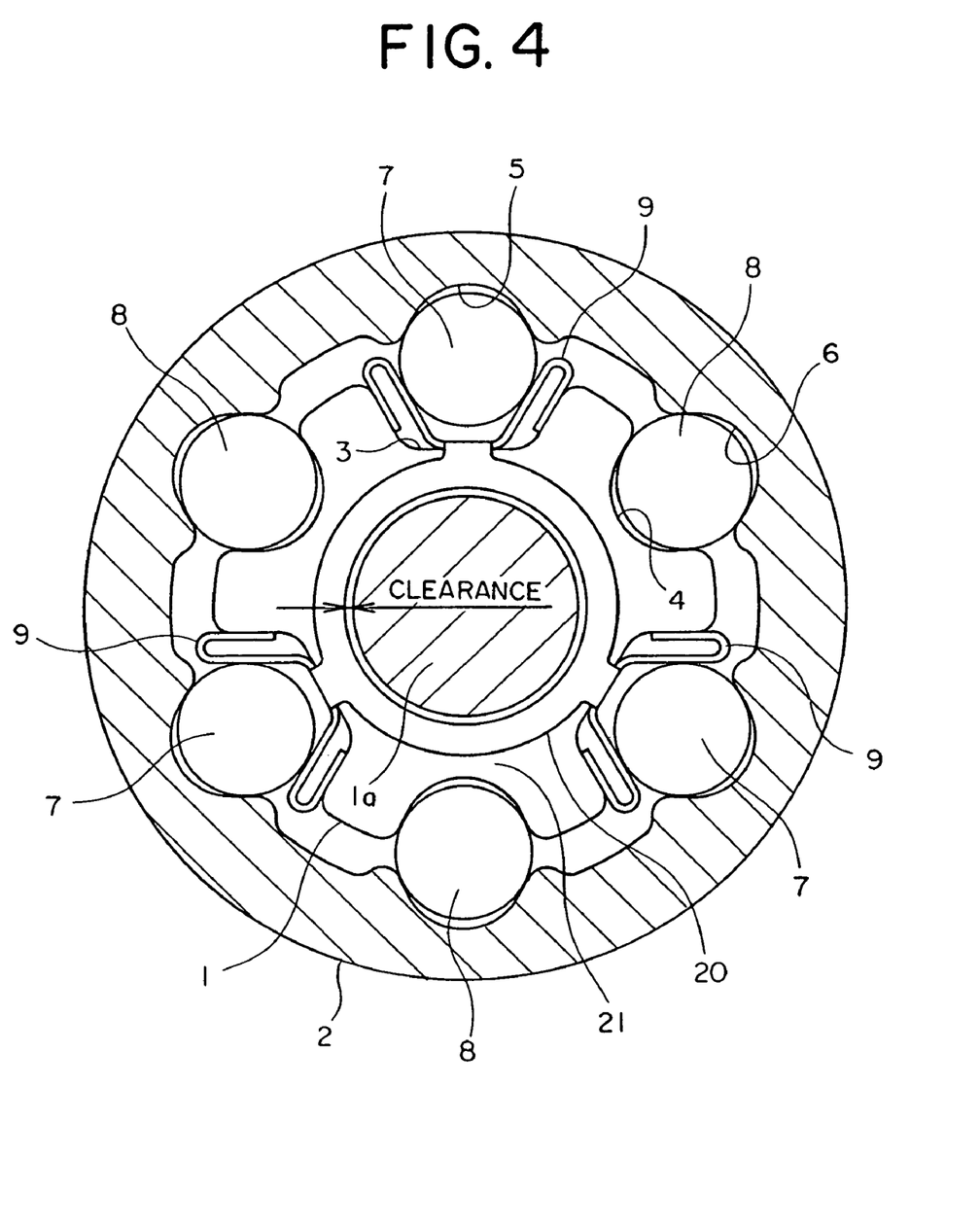
FIG. 4 is an enlarged cross sectional view taken along line Y-Y in FIG. 3.
Figure 5:
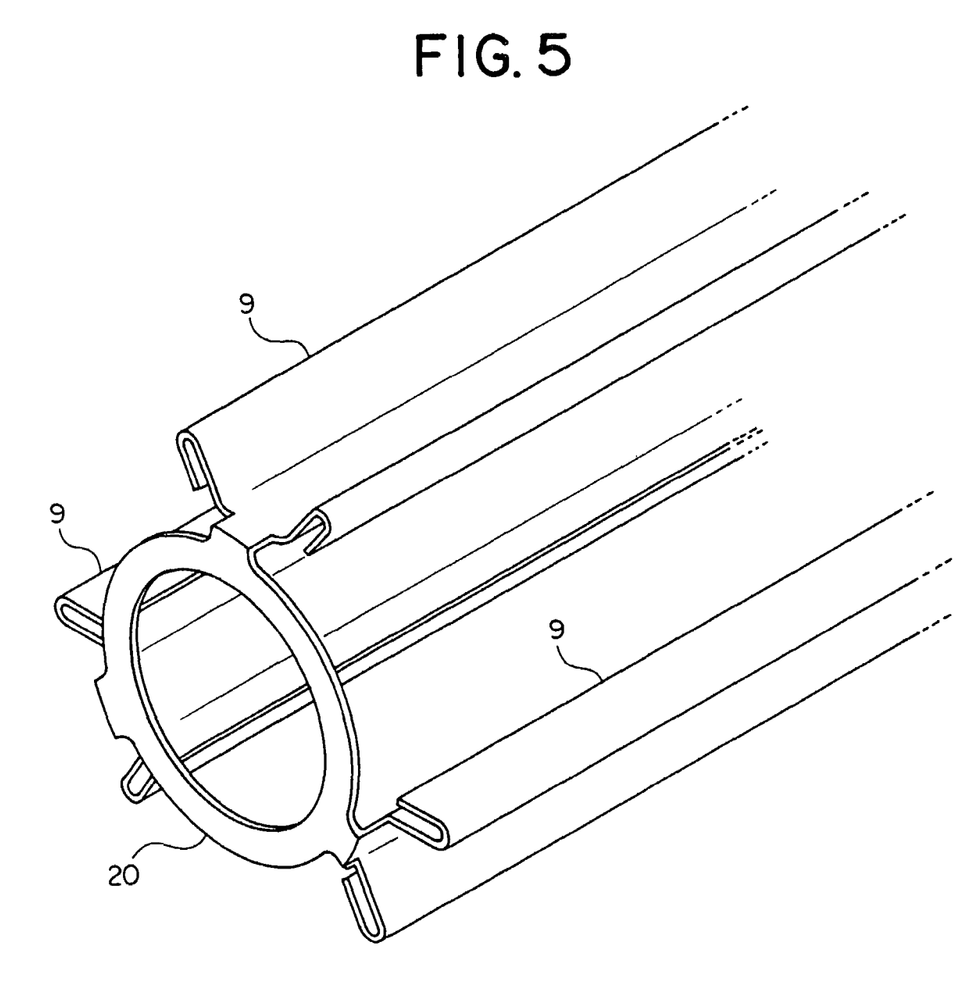
FIG. 5 is a perspective view showing elastic members (or leaf springs) connected by a connecting portion.
Figure 6:
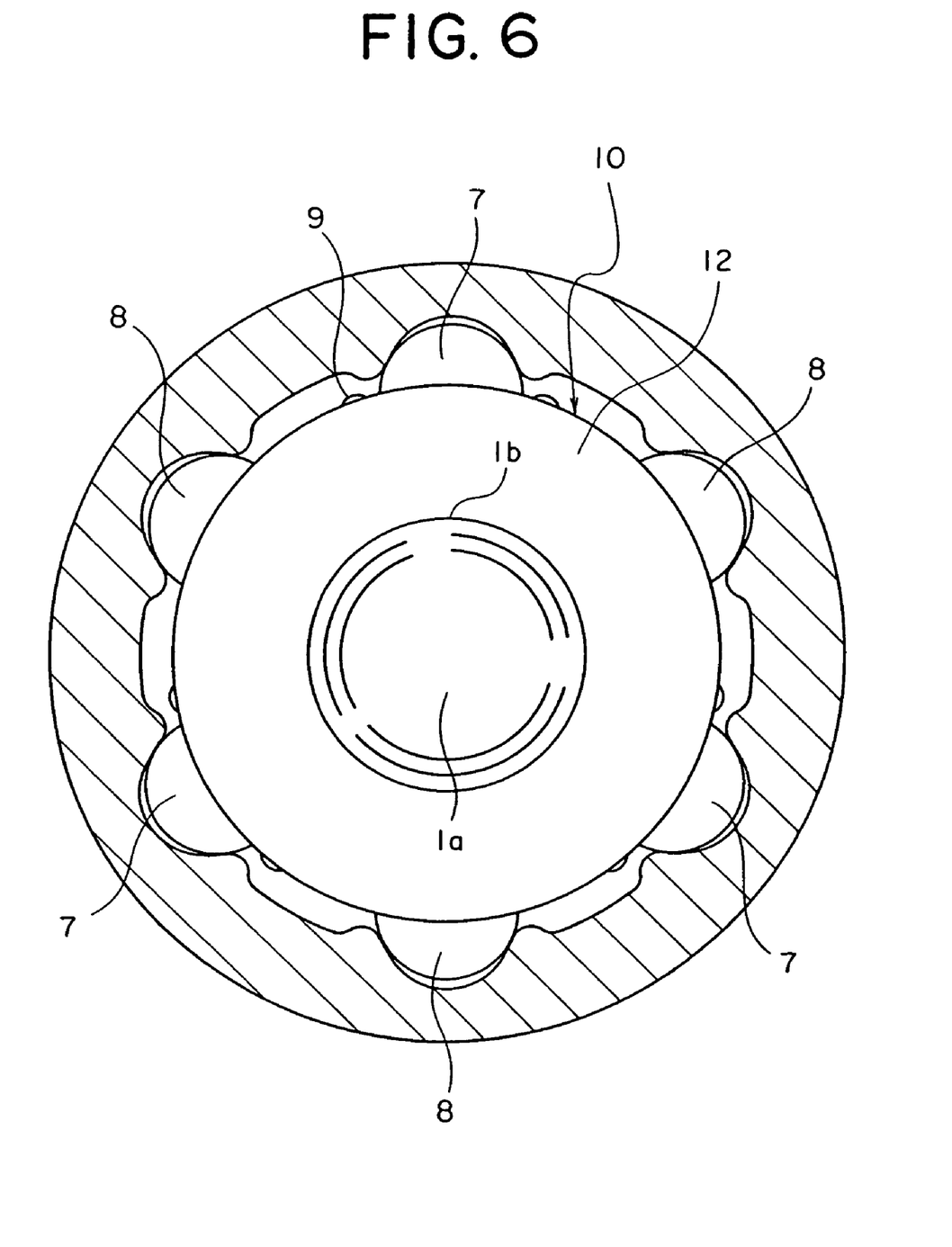
FIG. 6 is an enlarged view as seen from the direction indicated by arrow A in FIG. 3.

FIG. 4 is an enlarged transverse cross sectional view taken along line Y-Y in FIG. 3. FIG. 5 is a perspective view showing the elastic members (leaf springs) connected by a connecting portion. FIG. 6 is an enlarged view as seen from the direction indicated by arrow A in FIG. 3.

As shown in FIG. 3, a small diameter portion 1*a* is formed at an end portion of the male shaft 1. On the small diameter portion 1*a*, a stopper plate 10 for regulating axial movement of the needle rollers 8 is provided. The stopper plate 10 is composed of an elastic member 11 for applying axial preload and a pair of flat plates 12 and 13 between which the elastic member 11 for applying axial preload is held.

In the stopper plate 10 in this embodiment, the flat plate 13, the elastic member 11 for applying axial preload and the flat plate 13 are fitted on the small diameter portion 1*a* in the mentioned order, and then the end portion 1*b* of the small diameter portion 1*a* is clinched or plastically deformed so as to be firmly secured to the small diameter portion 1*a*.

Thus, the stopper plate 10 is adapted to preload the needle rollers 8 in the axial direction to prevent axial movement of the needle rollers 8 by means of the elastic member 11 for applying axial preload while the flat plate 13 is in contact with the needle rollers 8.

In addition, the stroke of the telescopic shaft can be determined by the stopper plate 10. This is because when the balls roll to impinge the stopper plate, the balls cannot roll any more.

The elastic member 11 for applying axial preload is made of a rubber, a resin or a steel leaf spring. The elastic member 11 for applying axial preload and the flat plates 12 and 13 may be constructed as separate members, but it is preferable that they are constructed as an integrally formed member in view of facility of assembling.

For example, in the case that the elastic member 11 for applying axial preload is made of a rubber, it can be made integral by applying vulcanization on the flat plates 12 and 13. Thus, a product that is easy to assemble can be made at low cost.

In the case that the elastic member 11 for applying axial preload is made of a resin, it can be made integral by molding a corrugated part integrally with the flat plates 12 and 13. In this case, the advantages same as above can be realized.

Furthermore, the flat plates 12 and 13 may be steel plates, resin plates, or steel plates covered with a resin coating.

The axial grooves 3, 4 of the male shaft 1 have surfaces 14 and 15 that are substantially perpendicular to the axial direction and in contact with the balls 7 and needle rollers 8.

As per the above, axial movement of the needle rollers 8 is regulated by the stopper plate 10 provided on the small diameter portion 1a of the male shaft 1 at one end thereof, and the other side of the needle rollers 8 abuts the surface 15 which is perpendicular to the axial direction so that axial movement thereof is regulated.

The flat plate 13 of the stopper plate 10 is in contact with the needle rollers 8, and the elastic member 11 preloads the needle rollers 8 appropriately so that the needle rollers 8 will not move in the axial direction.

As per the above, it is possible to preload the needle rollers 8 moderately to fix them without clearance in the axial direction. Thus, the needle rollers 8 are not moved in the axial direction when the male shaft 1 and the female shaft 3 slide relative to each other, and it is possible to positively prevent unpleasant knocking sounds from being generated.

Since the axial grooves 3, 4 of the male shaft 1 have the surfaces 14 and 15 that are substantially perpendicular to the axial direction and in contact with the balls 7 and needle rollers 8, it is possible to regulate the axial movement of the balls 7 and the needle rollers 8 by the surface 15 without providing an additional member. Accordingly, it is possible to reduce the number of the parts to reduce the manufacturing cost. In addition, weight reduction and size reduction can be made possible since additional members are not used.

In this embodiment, the three leaf springs 9 for preloading the three sets of balls 7 are connected by a ring-like connecting portion 20 as shown in FIGS. 3 to 5.

As shown in FIG. 3, the small diameter portion 1a at the end portion of the male shaft 1 has an annular surface 21 formed at its stepped portion. The ring-like connecting portion 20 is fitted on the small diameter portion 1a and disposed along the stepped annular surface 21.

The annular surface 21 at the stepped portion may be of any shape, though it should be an annular surface facing the axial direction of the male shaft 1.

The ring-like connecting portion 20 is connected with the axial end portions of the three leaf springs 9 at three positions on the circumferential edge thereof. As shown in FIG. 5, the ring-like connecting portion 20 is constructed integrally with the three leaf springs 9 that extend along the axial direction.

Accordingly, it is possible to make the three leaf springs 9 serving as rolling base surfaces can be made integral to reduce the virtual number of the parts from three to one, while adopting the structure in which the balls 7 and needle rollers 8 are used in combination. Thus, it is possible to reduce the number of the parts, decrease the time required for assembling and realize cost reduction.

The small diameter portion 1a formed at the end portion of the male shaft 1 passes through the ring-like connecting portion 20. Accordingly, when the three leaf springs 9 are assembled, the small diameter portion 1a at the end portion of the male shaft 1 is inserted through the ring-like connecting portion 20 to function as a guide for the assembling operation. Thus, the assembling operation can be facilitated, and the manufacturing cost can be reduced by a decrease in the time required for the assembling.

The ring-like connecting portion 20 is disposed in the clearance with respect to the axial direction between the flat plate 13 of the stopper plate 10 and the annular surface 21 at the stepped portion 21. This axial clearance is, for example, about 0.3 to 2.0 mm.

Thanks to the axial clearance, the ring-like connecting portion 20 does not constrain movement of the three leaf springs 9 even when the leaf springs 9 are deformed by a torque input.

As shown in FIGS. 4 and 5, each leaf spring 9, in cross section, is so shaped to be linearly extended substantially in parallel to the axial grooves 3 of the male shaft 1, and the flat portion at the central portion of each leaf spring 9 is joined to the circumferential edge portion of the ring-like connecting portion 20. Both end portions of each leaf spring 9 are folded outwardly from the center side.

The small diameter portion 1a formed at the end portion of the male shaft 1 is adapted to pass through the ring-like connecting portion 20. A clearance in the radial direction is formed between the small diameter portion 1a of the male shaft 1 and the ring-like connecting portion 20. The radial clearance is, for example, 0.2 to 1.0 mm. As is the case with the above-described axial clearance, the ring-like connecting portion 20 does not constrain movement of the three leaf springs 9 thanks to the presence of the radial clearance even when the leaf springs 9 are deformed by a torque input.

Second Embodiment

Figure 7:
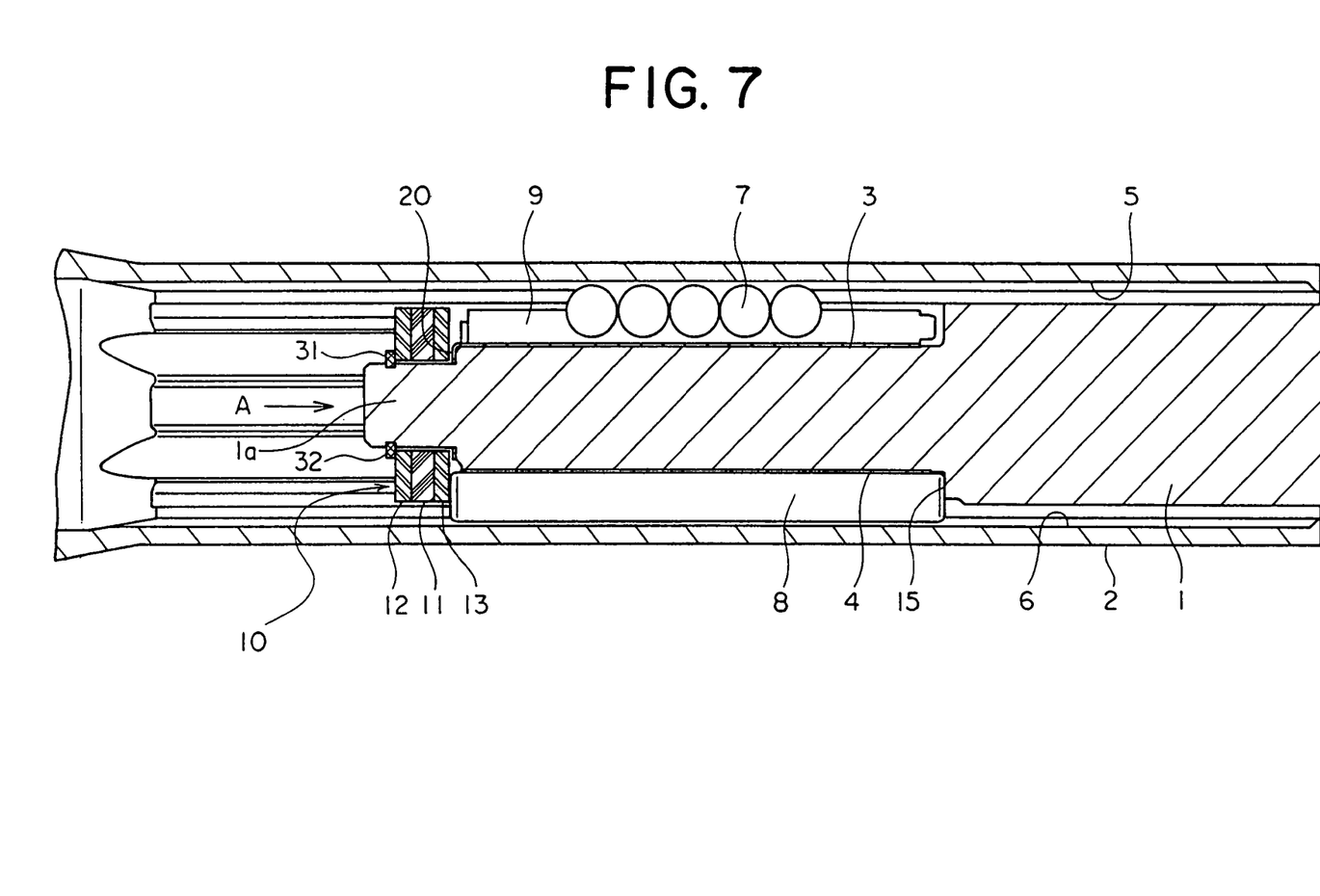
FIG. 7 is a longitudinal cross sectional view showing a telescopic shaft used for steering of a vehicle according to a second embodiment of the present invention.
Figure 8:
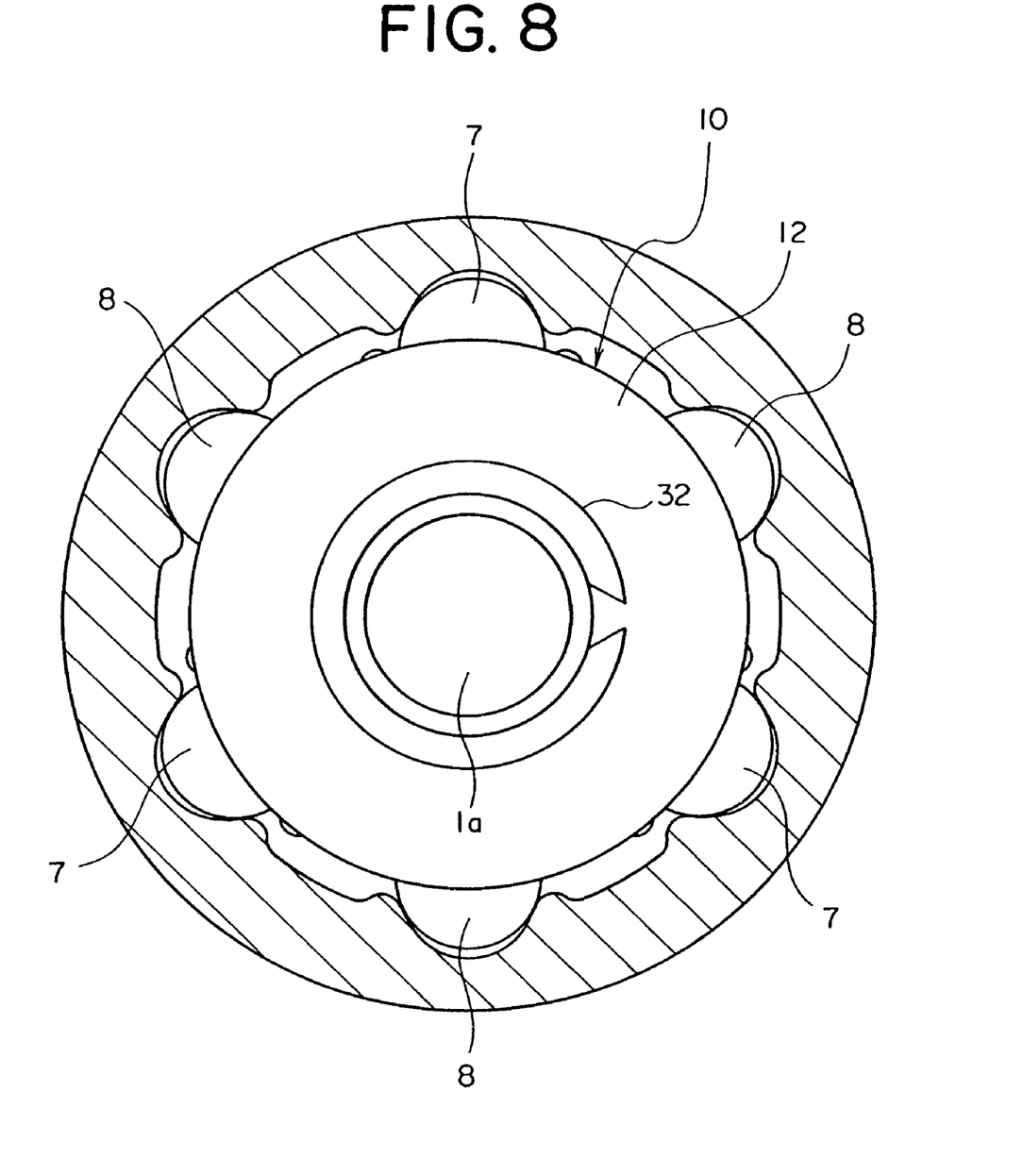
FIG. 8 is an enlarged view as seen from the direction indicated by arrow A in FIG. 7.

FIG. 7 is a longitudinal cross sectional view showing a telescopic shaft used for steering of a vehicle according to the second embodiment of the present invention. FIG. 8 is an enlarged view as seen from the direction indicated by arrow A in FIG. 7.

In this embodiment, a circumferential groove 31 is formed on the small diameter portion 1a of the male shaft 1. A retaining ring 32 is fitted in the circumferential groove 31. Thus, the stopper plate 10 is fixed with respect to the axial direction. The structures and operations other than the above are the same as those in the above-described embodiment.

Third Embodiment

Figure 9:
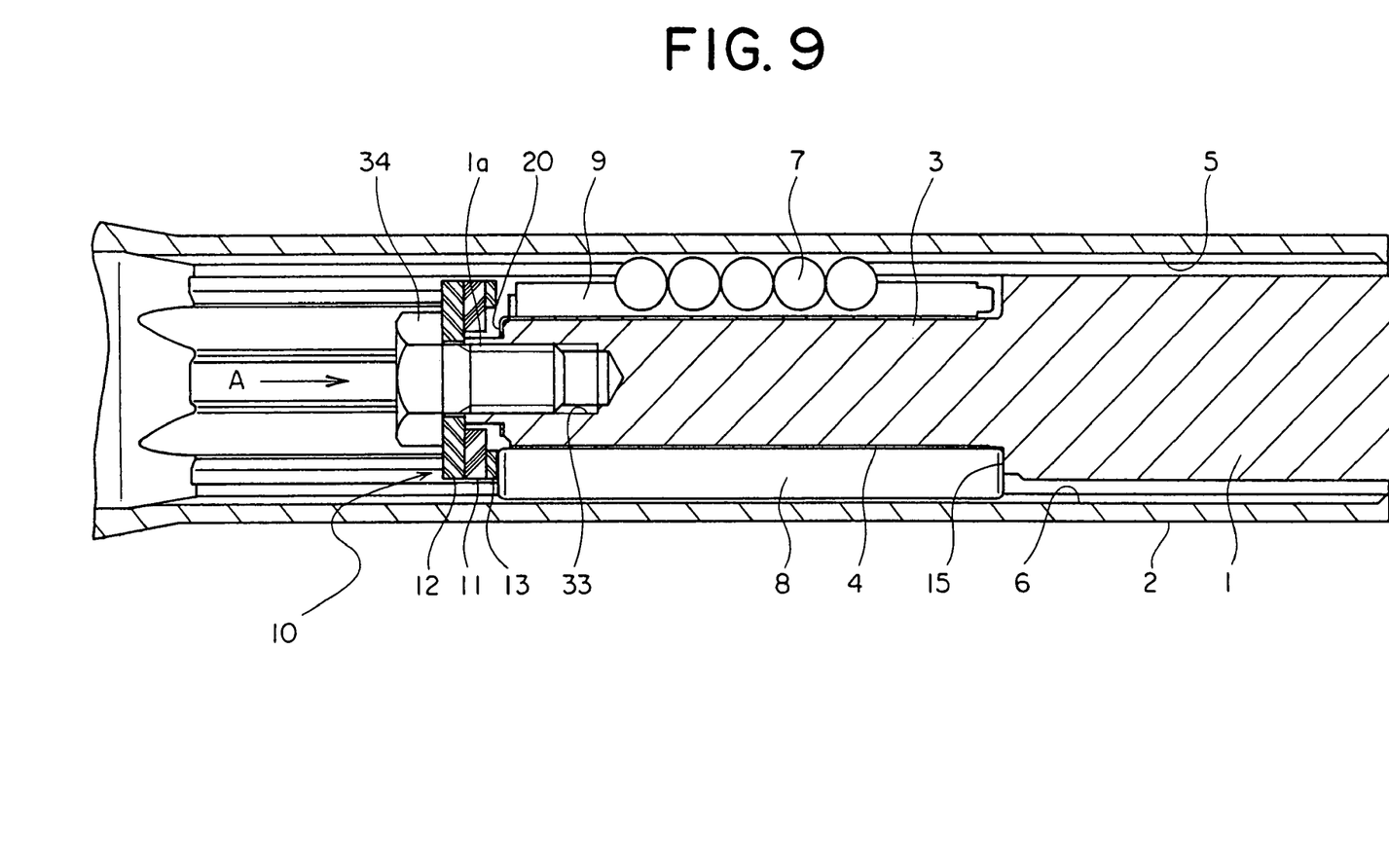
FIG. 9 is a longitudinal cross sectional view showing a telescopic shaft used for steering of a vehicle according to a third embodiment of the present invention.
Figure 10:
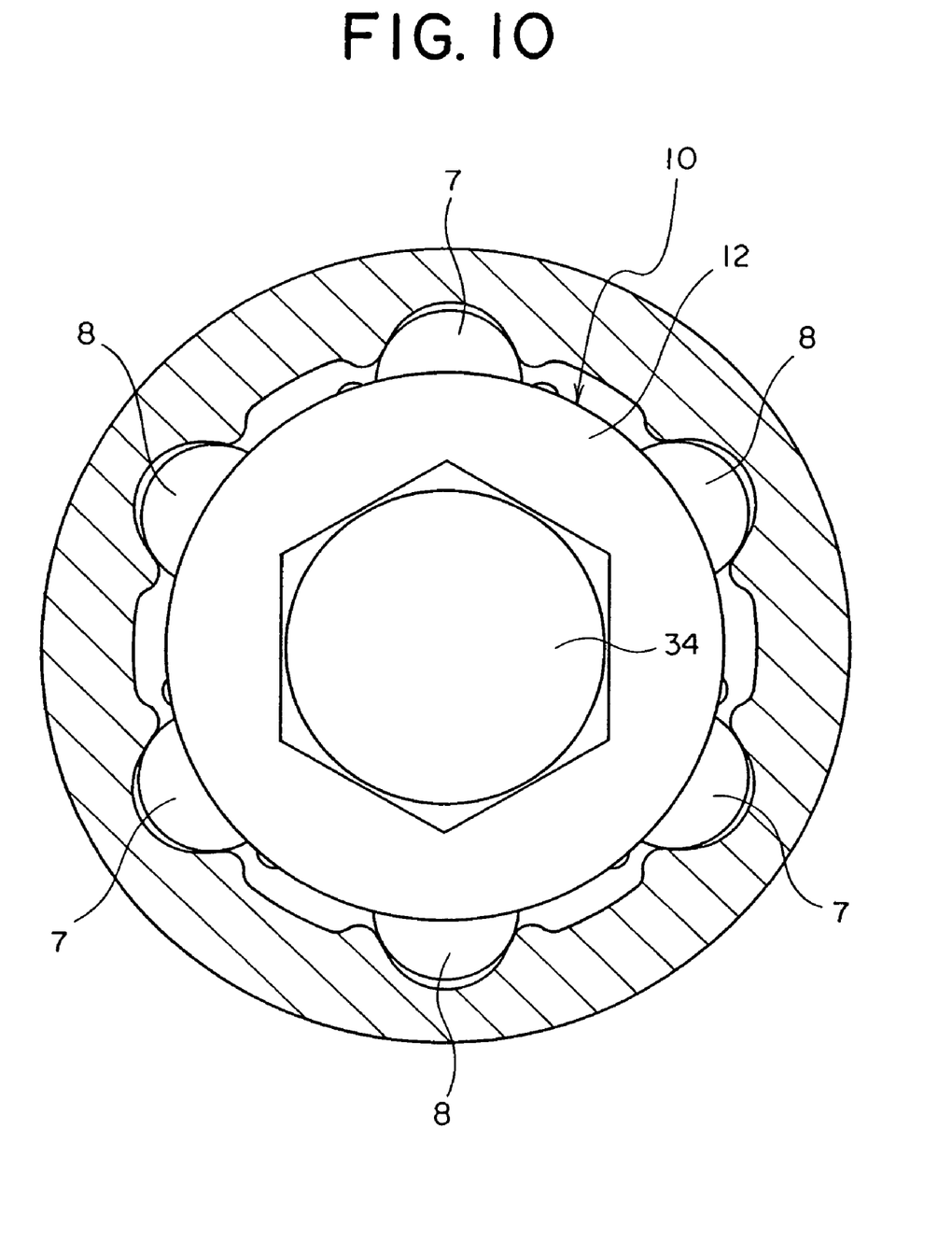
FIG. 10 is an enlarged view as seen from the direction indicated by arrow A in FIG. 9.

FIG. 9 is a longitudinal cross sectional view showing a telescopic shaft used for steering of a vehicle according to the third embodiment of the present invention. FIG. 10 is an enlarged view as seen from the direction indicated by arrow A in FIG. 9.

In this embodiment, a screw hole 33 extending in the axial direction is formed on the small diameter portion 1a of the male shaft 1. A bolt 34 is screwed into the screw hole 33, through the stopper plate 10 (more specifically, the flat plate 12) and tightened. Thus, the stopper plate 10 is fixed with respect to the axial direction. The structures and operations other than the above are the same as those in the above-described embodiment.

Fourth Embodiment

Figure 11:
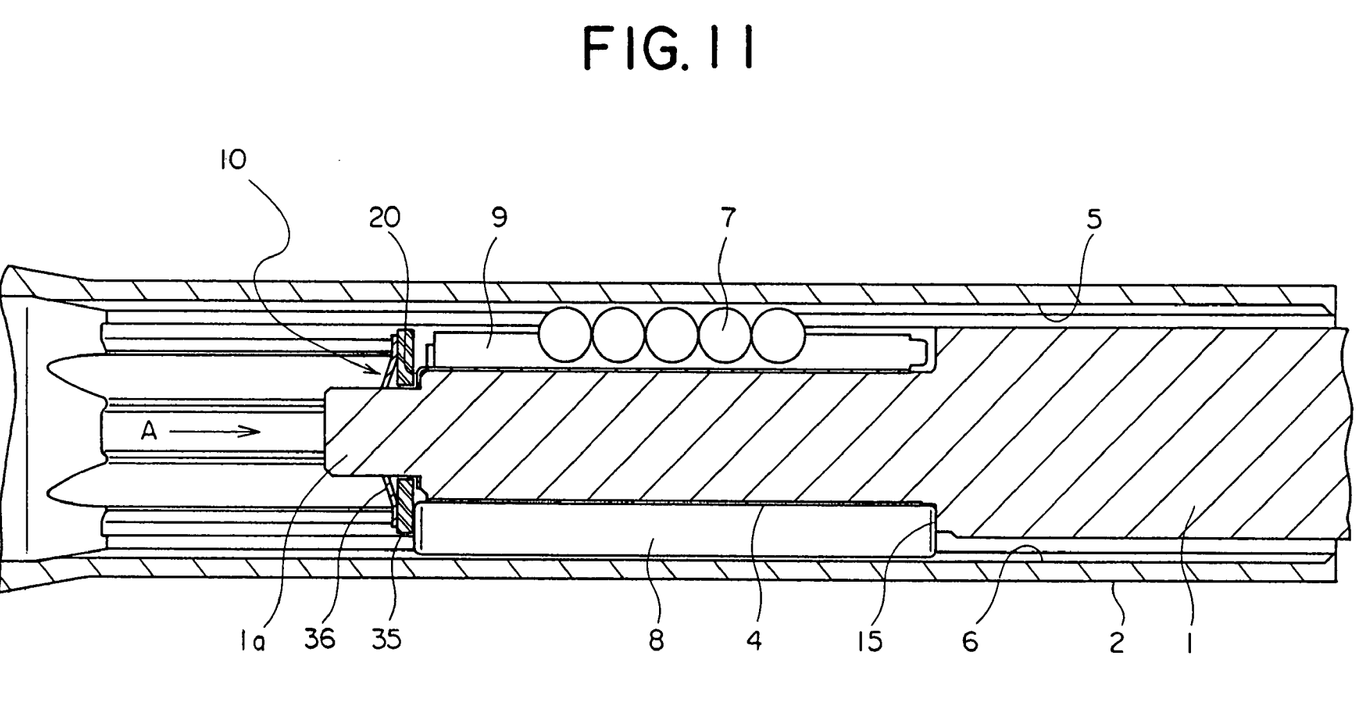
FIG. 11 is a longitudinal cross sectional view showing a telescopic shaft used for steering of a vehicle according to a fourth embodiment of the present invention.
Figure 12:
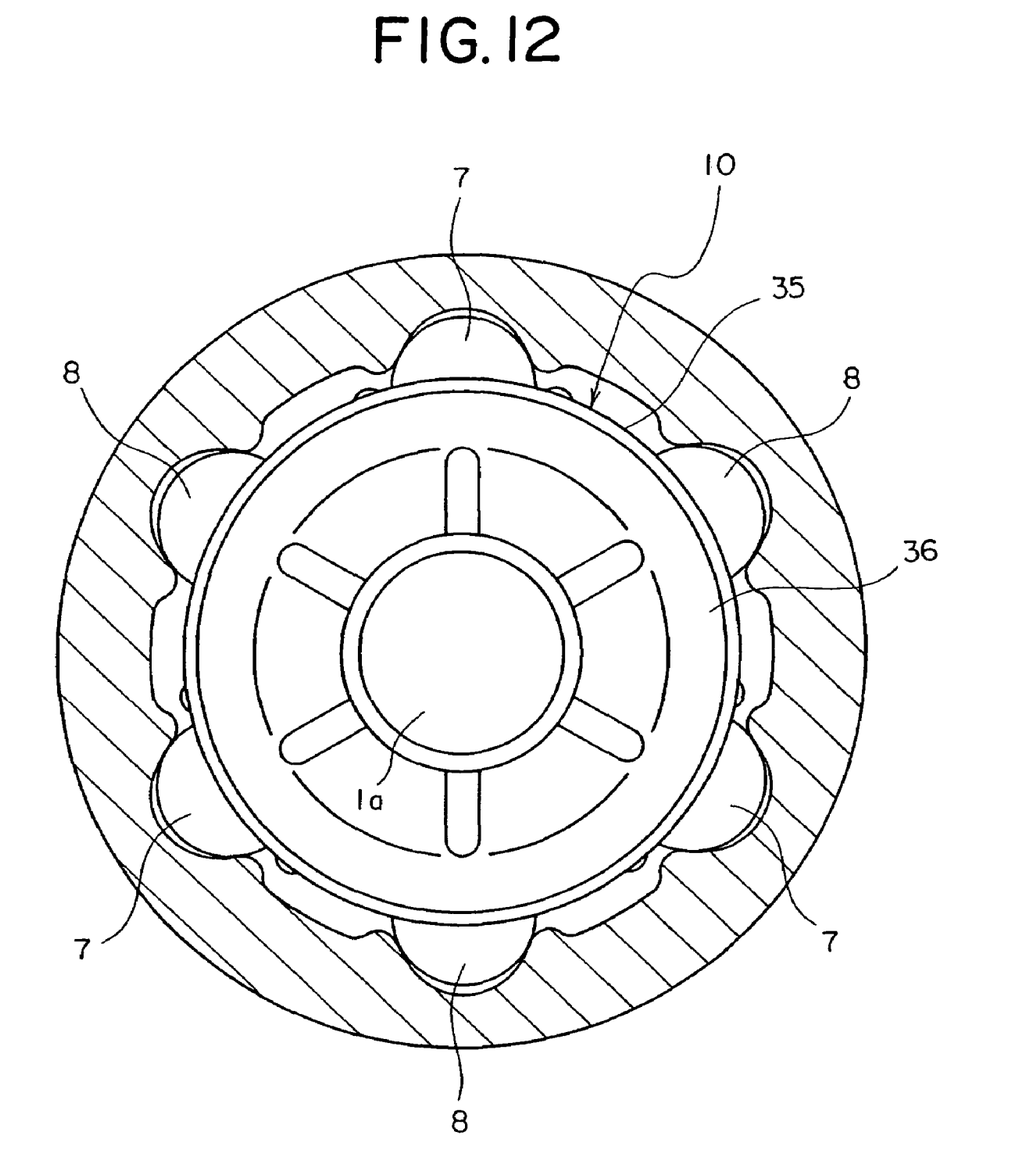
FIG. 12 is an enlarged view as seen from the direction indicated by arrow A in FIG. 11.

FIG. 11 is a longitudinal cross sectional view showing a telescopic shaft used for steering of a vehicle according to the fourth embodiment of the present invention. FIG. 12 is an enlarged view as seen from the direction indicated by arrow A in FIG. 11.

In this embodiment, the stopper plate 10 is composed of a flat plate 35 and a push nut 36 (i.e. the fixing means) for fixing the flat plate 35 at a desired position with respect to the axial direction of the male shaft 1. In the case that an elastic member for axial preload is not used in the stopper plate 10, the push nut 36 (fixing means) that allows to fix the flat plate 35 at a desired position is used. After setting the needle rollers 8 in the axial grooves 4 of the male shaft 1, the flat plate 35 is intermediately set, and the push nut 36 is pressed against it from the axial direction and fixed so that undesirable clearance will be eliminated. Thus, the needle rollers 8 are not moved in the axial direction when the male shaft 1 and the female shaft 3 slide relative to each other, and it is possible to prevent unpleasant knocking sounds from being generated. The structures and operations other than the above are the same as those in the above-described embodiment.

The present invention is not limited to the above-described embodiments, but it can be modified in various ways.

What is claimed is:

1. A telescopic shaft used for steering of a vehicle in which a male shaft and a female shaft are fitted to each other non-rotatably and slidably, wherein
    at least one set of torque transmission spherical members are disposed in at least one first set of intermediate fitting portions formed on the outer circumferential surface of said male shaft and the inner circumferential surface of said female shaft, and
    a stopper plate for regulating movement of said at least one set of torque transmission members with respect to the axial direction is provided adjacent an end portion of said male shaft, being characterized in that:
    at least one torque transmission roller with a cylindrical surface portion is disposed in at least one second set of intermediate fitting portions formed on the outer circumferential surface of said male shaft and the inner circumferential surface of said female shaft; and
    said roller is preloaded in the axial direction by said stopper plate.

2. A telescopic shaft used for steering of a vehicle according to claim 1, wherein said stopper plate comprises an elastic member for applying axial preload and a pair of flat plates that hold the elastic member therebetween.

3. A telescopic shaft used for steering of a vehicle according to claim 1, wherein said stopper plate is fixed to a small diameter portion formed at an end portion of said male shaft.

4. A telescopic shaft used for steering of a vehicle according to claim 1, wherein said stopper plate comprises a flat plate and fixing means for fixing the flat plate at a desired position with respect to the axial direction on said male shaft.

5. A telescopic shaft used for steering of a vehicle according to claim 1, wherein at least one of said first and second sets of intermediate fitting portions comprises at least one first and second sets of axial grooves formed on the outer circumferential surface of said male shaft and the inner circumferential surface of said female shaft, respectively, and the axial grooves on said male shaft have surfaces that are substantially perpendicular to the axial direction, one such perpendicular surface being in contact with said roller.

6. A telescopic shaft used for steering of a vehicle according to claim 5, wherein said stopper plate comprises an elastic member for applying axial preload and a pair of flat plates that hold the elastic member therebetween.

7. A telescopic shaft used for steering of a vehicle according to claim 5, wherein said stopper plate is fixed to a small diameter portion formed at an end portion of said male shaft.

8. A telescopic shaft used for steering of a vehicle according to claim 5, wherein said stopper plate comprises a flat plate and fixing means f or fixing the flat plate at a desired position with respect to the axial direction on said male shaft.

9. A telescopic shaft used for steering of a vehicle according to claim 5, wherein there are plural sets of torque transmission spherical members and plural torque transmission rollers disposed alternately with said sets of torque transmission spherical members in respective first and second sets of axial grooves, and wherein said rollers are needle rollers.

* * * * *